(12) United States Patent  
McGlynn

(10) Patent No.: US 9,173,382 B1  
(45) Date of Patent: Nov. 3, 2015

(54) WATER CHANGING AND CLEANING SYSTEM AND DEVICE FOR BOWL, AQUARIUM OR POND KEPT PET FISH

(71) Applicant: John William McGlynn, Bayside, NY (US)

(72) Inventor: John William McGlynn, Bayside, NY (US)

(73) Assignee: John William McGlynn, Bayside, NY (US)

( * ) Notice: Subject to any disclaimer, the term of this patent is extended or adjusted under 35 U.S.C. 154(b) by 0 days.

(21) Appl. No.: 14/121,574

(22) Filed: Sep. 19, 2014

(51) Int. Cl.
*A01K 63/04* (2006.01)
*A01K 63/00* (2006.01)
*A01K 61/00* (2006.01)

(52) U.S. Cl.
CPC .............. *A01K 63/006* (2013.01); *A01K 61/001* (2013.01); *A01K 63/00* (2013.01)

(58) Field of Classification Search
CPC ............................. A01K 61/003; A01K 63/006
USPC .......................................................... 119/264
See application file for complete search history.

(56) References Cited

U.S. PATENT DOCUMENTS 6,357,169 B1 * 3/2002 Gouge ............................... 43/56
8,006,644 B1 * 8/2011 Virk ............................... 119/201

* cited by examiner

Primary Examiner — Kristen C Hayes

(57) ABSTRACT

A water changing and cleaning system and device for bowl, aquarium or pond kept pet fish is disclosed. You can pour the fish directly from a bowl into this invention, (capacity is unlimited due to flow through design). Device comprises a container within a container, the inner container features a gill port, running horizontally and flush with the bottom of the container, water flows through the inner container and rises in the space between the two containers, until it overflows from the provided outlet on the outer container, carrying unwanted matter with it. Using a source of clean water to flush through the device, once a satisfactory level of cleanliness is observed the inner container is removed and the fish is returned to its cleaned Bowl. The fish was never out of water during the process. Device can be used to capture fish, so no nets required.

5 Claims, 10 Drawing Sheets

WATER CHANGING AND CLEANING SYSTEM AND DEVICE FOR BOWL, AQUARIUM OR POND KEPT PET FISH

BACKGROUND OF THE INVENTION

Problem Solved: Returning a pet fish to its bowl, pond or aquarium, without transferring old or dirty water or detritus back into your cleaned fishbowl, pond or aquarium.

Containers and nets: you place the fish in a container of water, usually with the aid of a net. In the efforts to catch the fish you can damage/injure the fish especially exotic varieties, and stir up dirt and sediment, which will be transferred with the captured fish into the container.

You can introduce the fish in water directly into this invention, (capacity is unlimited due to flow through design). Device can be used to capture fish, so no net required.

BRIEF SUMMARY OF INVENTION

This invention makes it possible to change the water in a fishbowl, without the pet fish being out of its water.

It accomplishes this by means of two containers one placed inside the other.

The inner container has a gill port flush with the bottom of the inner container.

The port facilitates the evacuation of unwanted substances from the fishbowl during water changes.

It holds the fish in clean water while the bowl is cleaned.

And the end result is a cleaner fishbowl as no unwanted substances are reintroduced to the cleaned bowl.

The fish did not need to be netted and spent no time out of water, Minimizing damage and stress to the fish.

DETAILED DESCRIPTION OF THE INVENTION

1. Outer receptacle/container with outlet/overflow, made from injection molded BPA free acrylic
2. Inner receptacle/container, made from injection molded acrylic. With contoured radiused interior, and a Gill port on one side
3. Gill port intended to produce a more natural flow of liquid.
4. Source or container of fresh clean conditioned water
5. Closed cell urethane foam flotation collar to provide flotation option for inner receptacle 2

Figure 1:
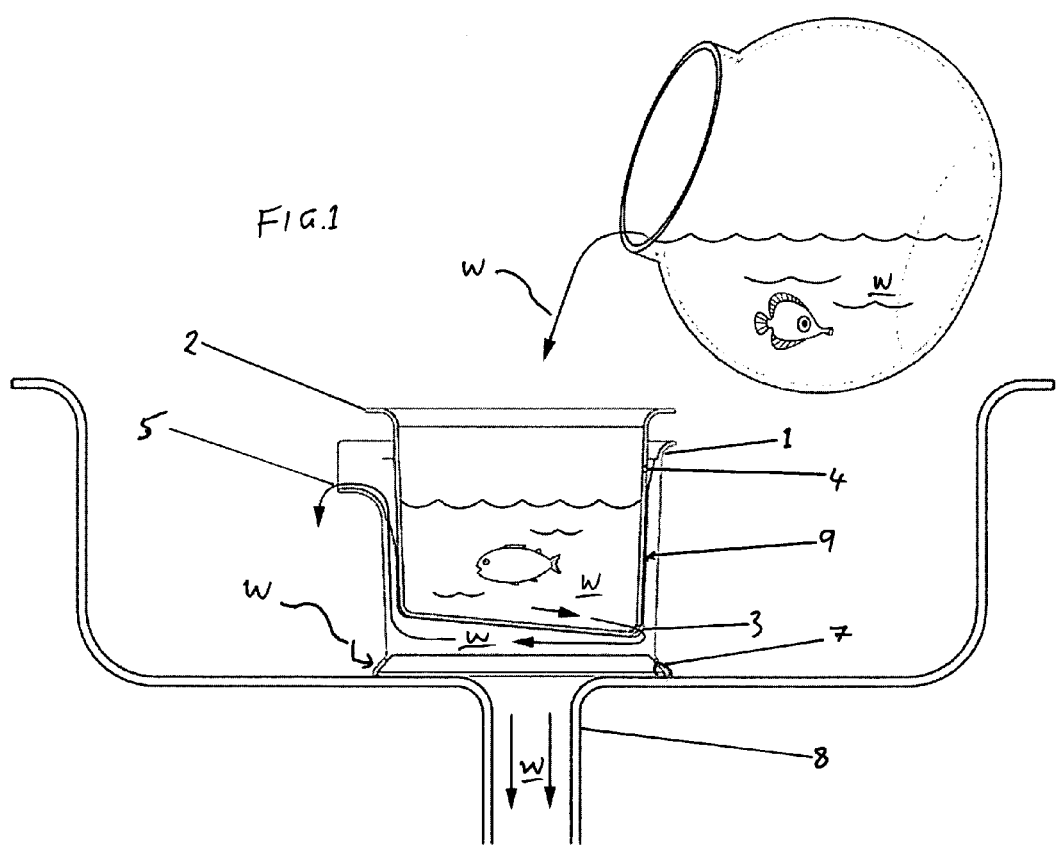
FIG. 1 Shows fish bowl contents introduced into the water changing device, With water flowing through device outlet and into sink drain through drainage channels in base of device.
Figure 2:
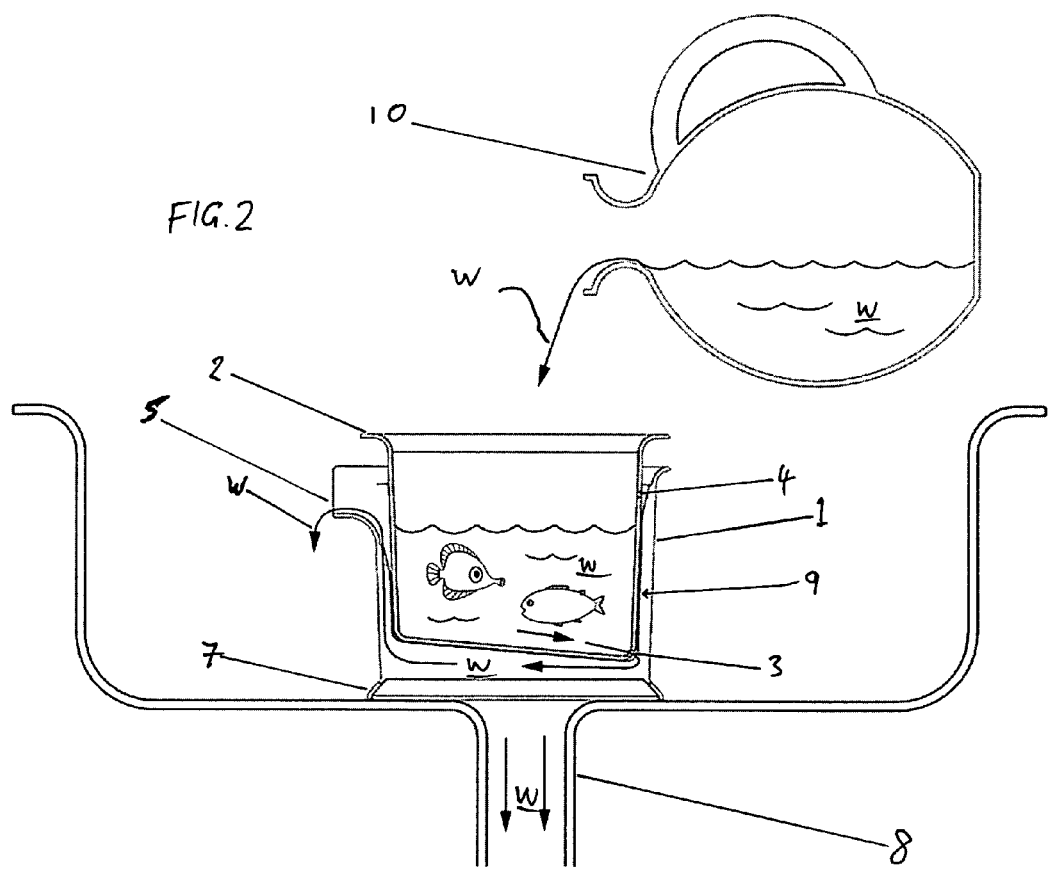
FIG. 2 Shows clean water being poured into device to flush dirty water through device, with water flowing through device outlet and into sink drain through drainage Channels in base of device.
Figure 5:
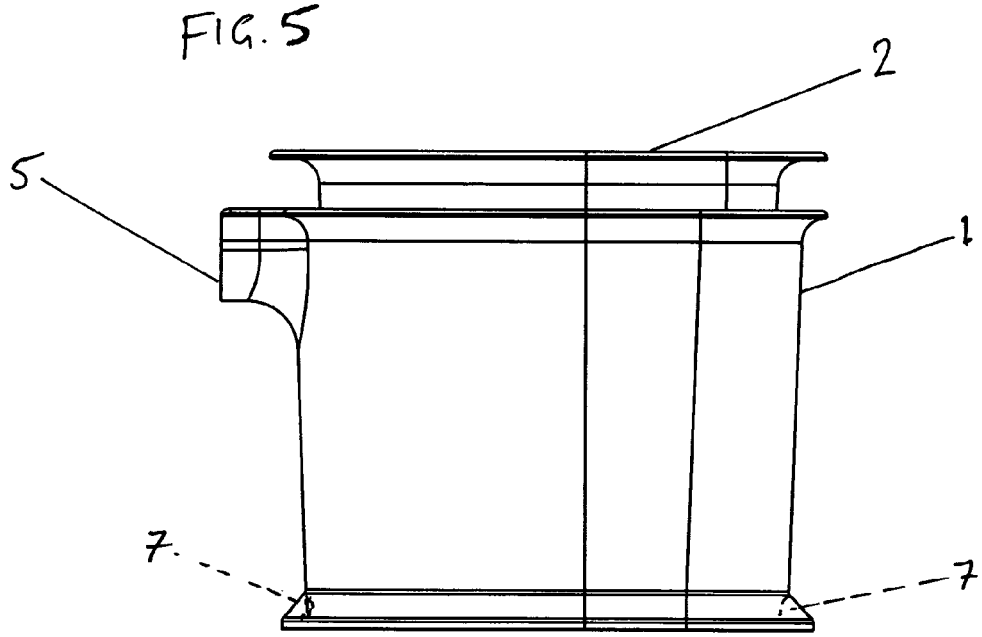
FIG. 5 Shows side view of device.
Figure 6:
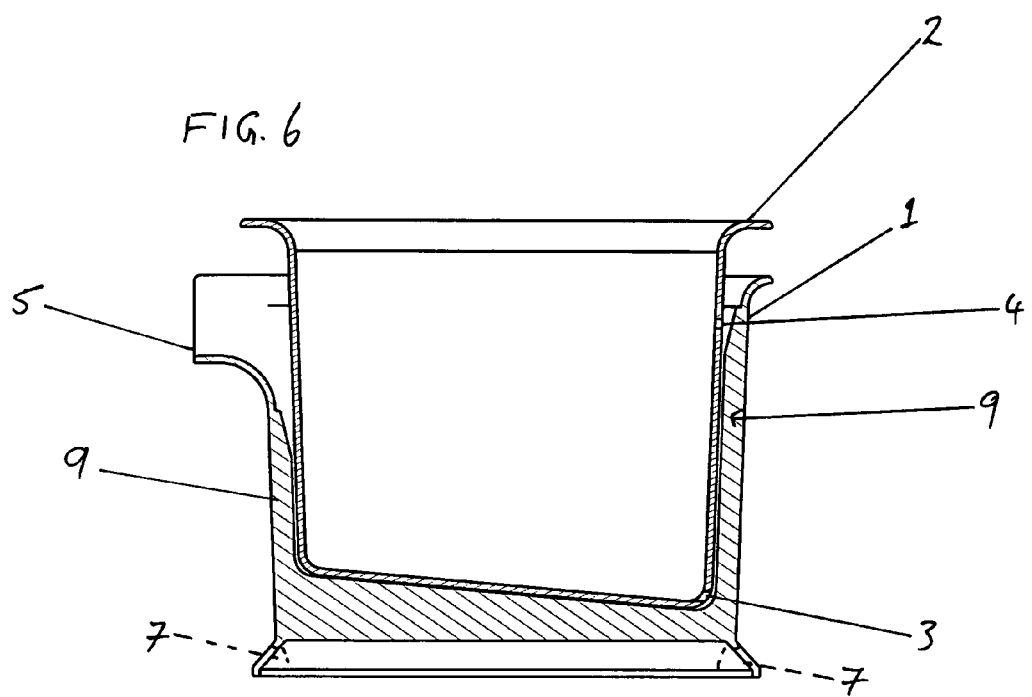
FIG. 6 Shows a cross section of assembled device.
Figure 7:
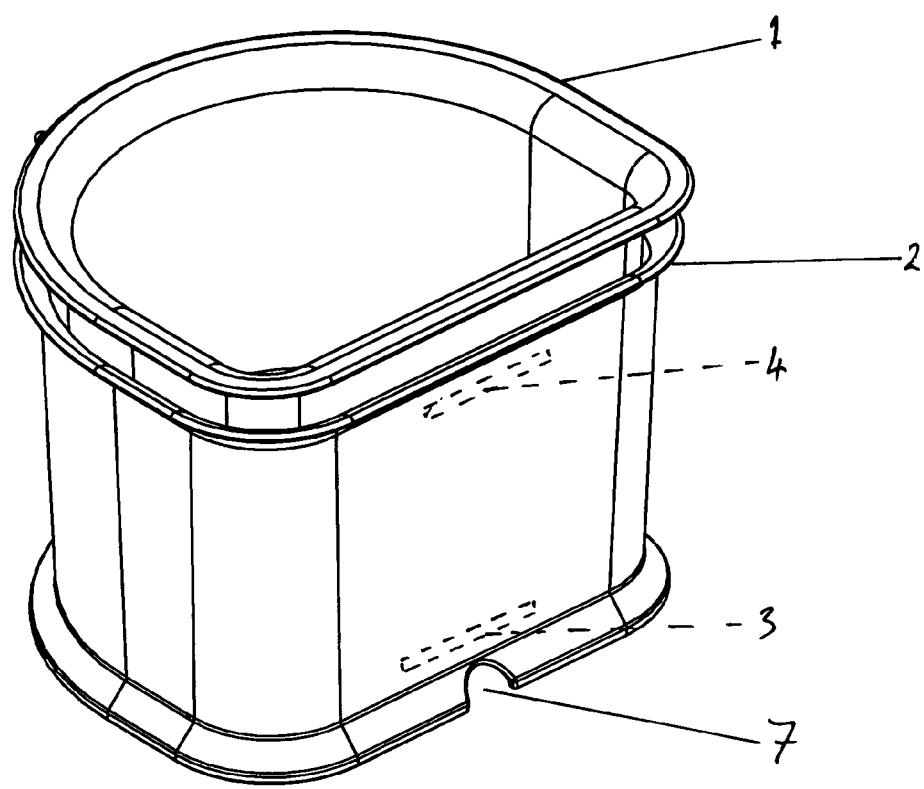
FIG. 7 Shows a rear isometric view of assembled device.

Relationship Between the Components:

Container 2 fits inside container 1 and container 2 is keyed to 1 (FIGS. 5-6). there is also standoffs or ribbing 8 inside container 1 to maintain clearance for water W to flow through the device (FIG. 6). In this example a bowl containing fish in their water 10 is poured into and flows through the device, using a Gill port 3, at the bottom of container 2 (FIG. 1). and on the opposite side to overflow outlet 4 of container 1 As the water is introduced it begins to flow into the space between the inner and outer containers 1-2, when the water reaches the outlet 4 on the outer container 1 it pours out, the water remains at an equal level in both containers 1-2, regardless of whether water is being introduced or not, once the device is filled. The water level in container 2 is always sufficient to cover and sustain the fish within it (FIGS. 1-2).

The cleaning element of this system requires a source or container of clean conditioned fresh or salt water 10. The assembled device can be placed into a sink, covering the sink drain 8 or alternatively on the edge of a sink with the outlet 4 orientated to allow the device to empty into the sink. This water W is then carefully poured into container 2, and flushes the old or dirty water, by displacement and dilution from the container 2 the water will flow through the gill port 3 and into the space between containers 1-2, exiting at the outlet 5, the water 10 then flows through the drainage channels 7 in the base of the outer container 1 and into the sink drain 8 (FIG. 1).

Figure 3:
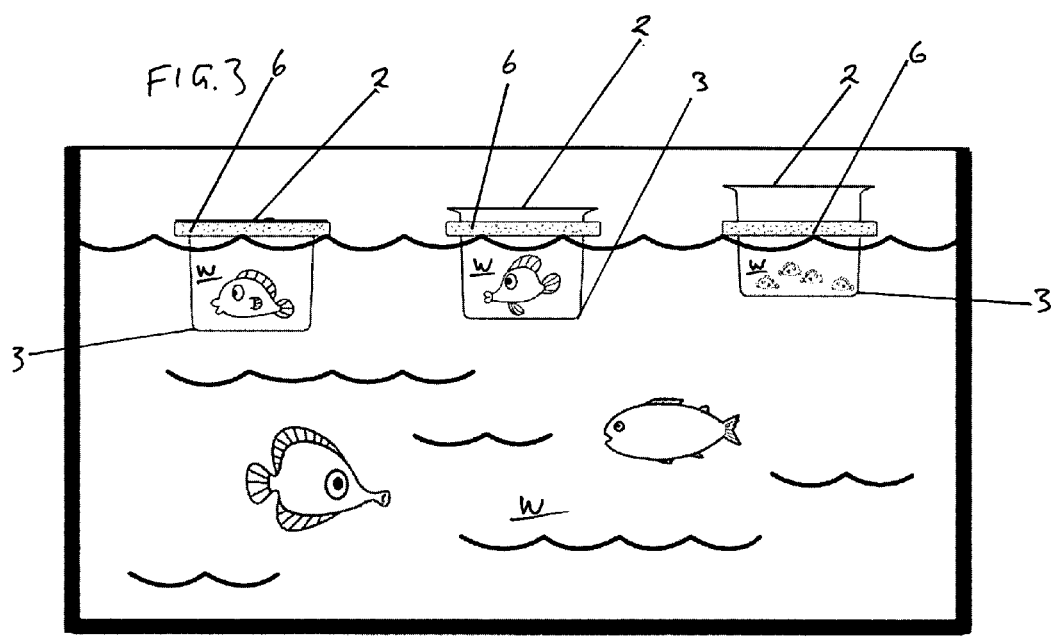
FIG. 3 Shows three inner containers floating at different levels in an Aquarium, using the closed pore urethane foam flotation ring.

The cleaning action is further enhanced by lifting container 2 from container 1 (FIGS. 2-4), this will impart a slight suction on the water in container 2 through the gill port 3, as the containers 2-1 are separated. As the inner container 2 is lifted, the water having a self-leveling nature will flow through the gill port 3 into container 1. This also enhances the cleaning action. As the user lifts container 2, the clean water 10 from source or container will continue to be carefully poured into container 2, maintaining a sufficient water level until the water in container 2 is clean and free from detritus.

Figure 4:
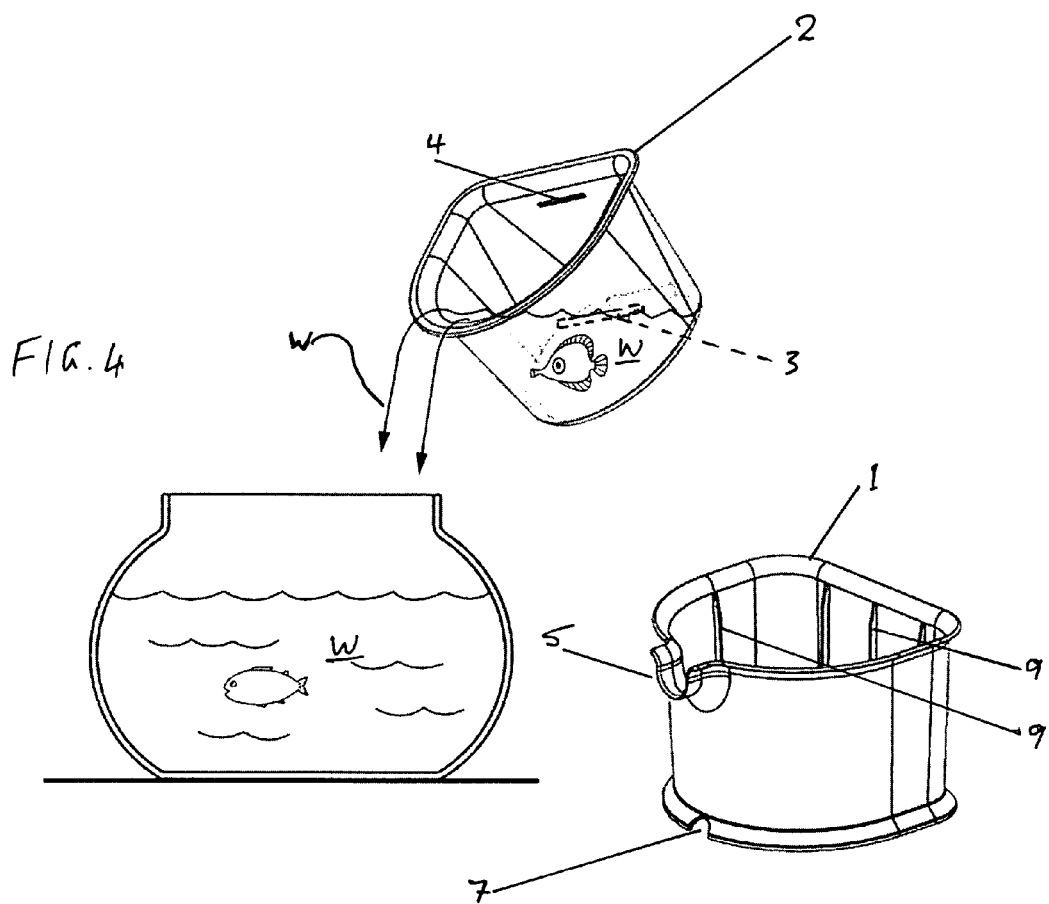
FIG. 4 Shows fish being returned to cleaned bowl while contained in the Vee of the tilted inner container.

At this point the user will tilt the inner container 2 to one side until water no longer flows from the gill port 3. The fish will be contained in the clean water W remaining in the vee of container 2 (FIG. 4). Fish can now be returned to bowl, pond or aquarium by carefully pouring from or immersing tilted container 2 into bowl, pond or aquarium.

The Inner container 2 can also be used as a nursery or isolation tank, with the ability to float at differing levels with the use of the closed cell urethane foam collar 6 (FIG. 3), which is adjustable for height due to its interference fit on container 2, this has the advantage of allowing differing water levels within container 2 making it suitable for a wider range of aquatic species.

Figure 8:
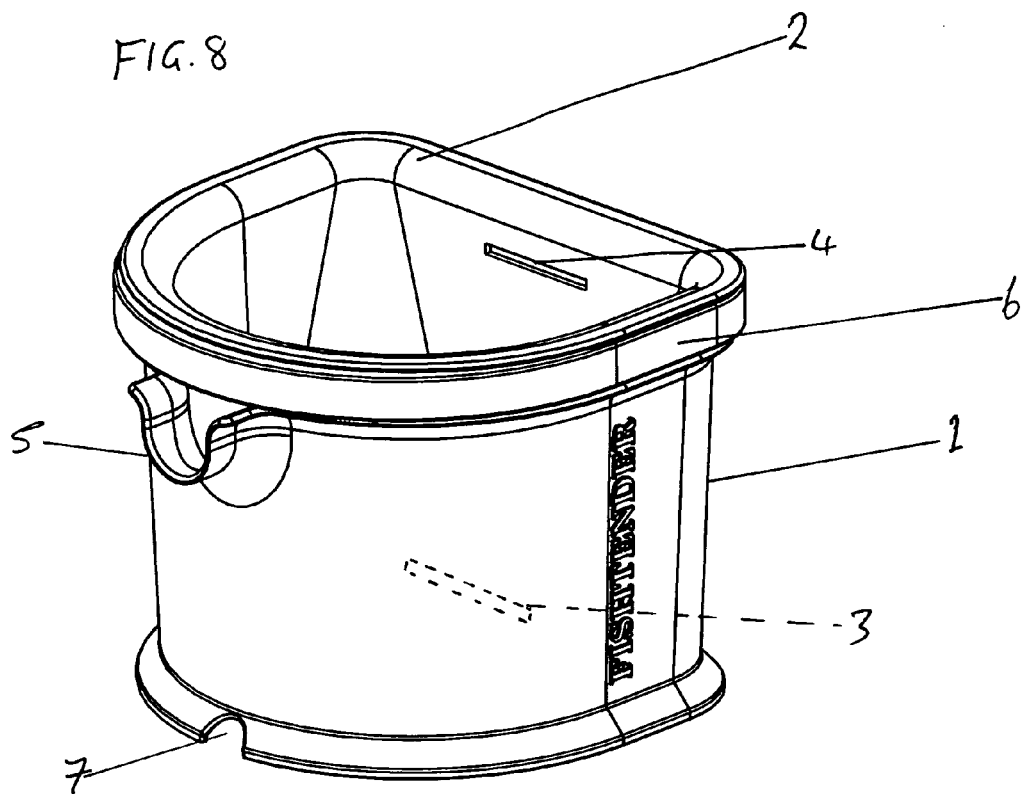
FIG. 8 Shows a front isometric view of assembled device.
Figure 9:
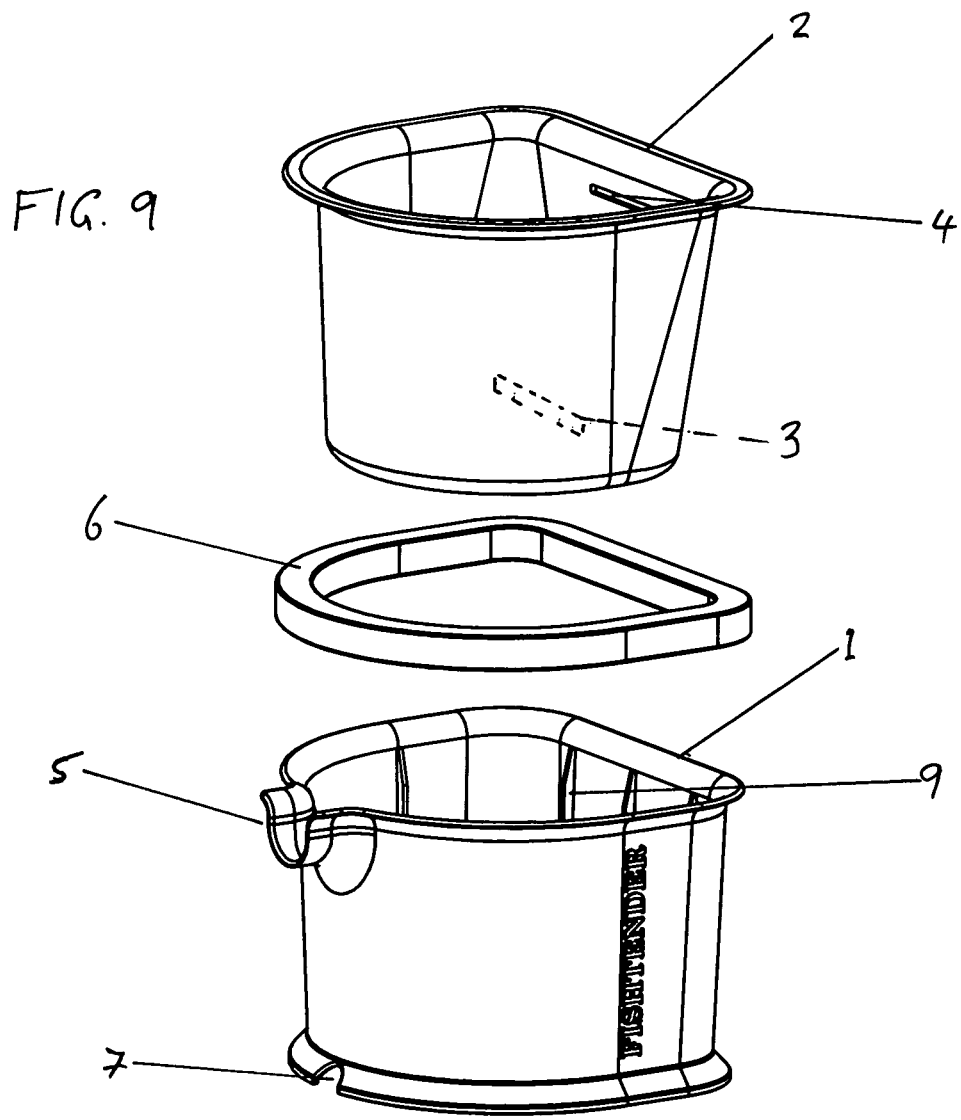
FIG. 9 Shows an exploded view of device components.
Figure 10:
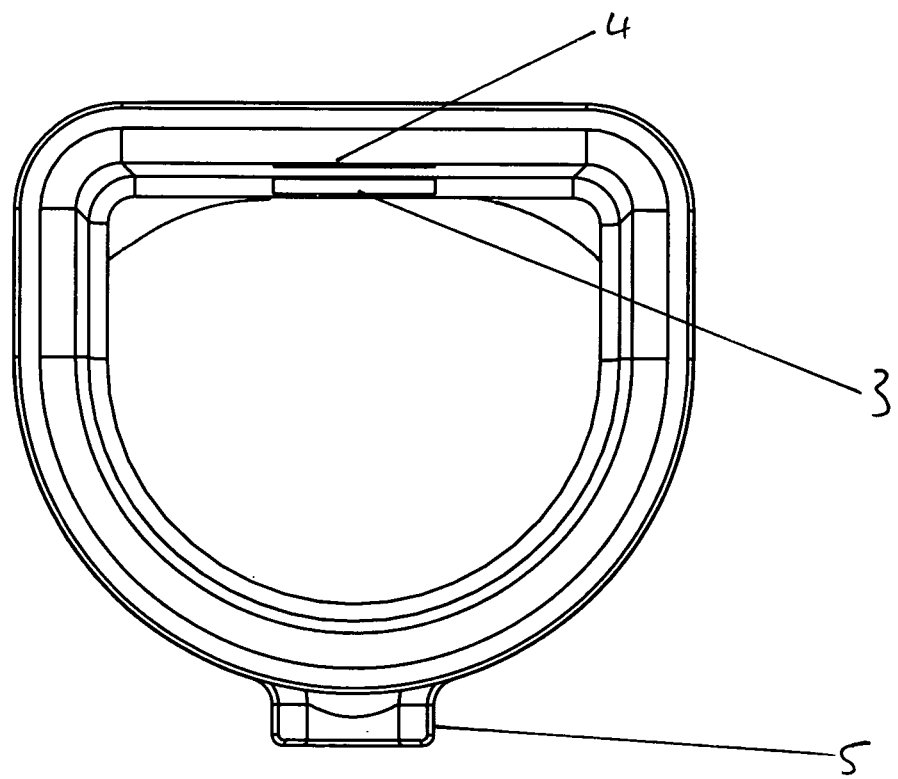
FIG. 10 Shows a top or plan view of assembled device.

The assembled device (FIG. 8) can also be used to minimize loss of fish, when siphoning water from an aquarium, the siphon tube outlet would be placed into the assembled device and would catch any animal unfortunate enough to be drawn into the siphon tube and would reduce the risk of losing the fish down a sink drain for example.

What is claimed is:

1. A system for ensuring that a fish is held safely and returned to its aquarium in clean water after cleaning fishbowl or tank, said system comprising:

outer and inner interlocking D shaped bowls;

wherein said outer bowl is open at an upper end and has a closed lower end, said outer bowl having a sidewall which extends from the closed lower end to a rim at the upper end, and being provided with an outwardly facing spout at the rim, wherein an upper lip of the outer bowl is flared outwards to provide a means of grip, and the closed lower end is provided with an outwardly flared base, with drain holes in the form of notches in the base;

the outer bowl being provided with a plurality of vertical ribs along interior sidewalls of the outer bowl, wherein said vertical ribs provide additional rigidity and clearance and act as standoffs to facilitate water flow through the system when said inner bowl is placed within the said outer bowl;

the inner bowl having a flared lip at an open upper end to provide a means of grip, a sidewall extending between said flared lip and a lower end, and elongated horizontal gill ports at upper and lower ends of said inner bowl;

wherein the lower end of the inner bowl is slanted at an angle, with the gill port of at the lower end of said inner bowl is formed at a junction of the inner bowl sidewall and said slanted lower end;

wherein when the inner bowl is assembled within the outer bowl the inner bowl will be offset from the interior sidewall of the outer bowl by the depth of the vertical ribs and the flared lip will extend upwardly beyond the upper rim of said outer bowl, and water poured into the inner bowl will exit the inner bowl at the gill ports into the outer bowl where it fills the outer bowl before exiting the spout of the outer bowl.

2. The system of claim 1, wherein the bowls are manufactured using injection molded BPA free acrylic.

3. The system of claim 2, wherein the closed cell urethane foam flotation ring fits on an outer surface of the sidewall in an interference fit and is adjustable along the outer surface of the sidewall so that when the inner bowl is placed in water it can float at different levels.

4. A method for safely holding a pet fish during bowl and aquarium cleaning and returning pet fish safely, in cleaned water to its bowl and aquarium, without transferring dirt or debris possibly contained in the captured fishes water during transfer to apparatus, back into clean bowl or aquarium, the method comprising the steps of;

providing the device of claim 1;

pouring the water and fish from the aquarium into the inner bowl when the inner bowl is placed within the outer bowl;

pouring clean water into the inner bowl to flush debris and dirty water from the system;

allowing the water from the aquarium to flow out of the system by way of the lower gill port into the outer bowl where it fills the outer bowl before exiting the spout of the outer bowl;

wherein the water level remains constant in the system so that there is always sufficient water to sustain the fish even when the pouring of water from bowl or tank has ceased.

5. The method of claim 4, further comprising lifting the inner bowl from the outer bowl in order to allow the water to drain more quickly; wherein lifting the inner bowl from the outer bowl increases the scavenging by creating a partial suction through the gill port.

* * * * *